US006517940B1

(12) United States Patent
Millero et al.

(10) Patent No.: US 6,517,940 B1
(45) Date of Patent: Feb. 11, 2003

(54) EXTERIOR-DURABLE MULTI-LAYER COMPOSITE COATING COMPOSITIONS

(75) Inventors: Edward R. Millero, Gibsonia, PA (US); Shelley D. Sturdevant, Harwick, PA (US); Carole A. Conley, Verona, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/563,615

(22) Filed: May 2, 2000

(51) Int. Cl.[7] .......................... B32B 15/18; B32B 15/20; B32B 27/30; B32B 27/36; B32B 27/40

(52) U.S. Cl. ................. 428/411.1; 428/421; 428/423.1; 428/457; 428/480; 428/522

(58) Field of Search .............................. 428/411.1, 421, 428/423.1, 457, 480, 522

(56) References Cited

U.S. PATENT DOCUMENTS

| | | | | | |
|---|---|---|---|---|---|
| 3,470,014 | A | | 9/1969 | Koblitz et al. | 117/72 |
| 4,220,575 | A | | 9/1980 | Wallace | 260/29.3 |
| 4,228,055 | A | | 10/1980 | Wallace | 260/29.3 |
| 4,273,829 | A | * | 6/1981 | Perreault | 428/383 |
| 4,281,076 | A | * | 7/1981 | Kamimura | 523/415 |
| 4,314,004 | A | | 2/1982 | Stoneberg | 428/421 |
| 4,659,768 | A | | 4/1987 | Tortorello et al. | 524/512 |
| 4,720,405 | A | | 1/1988 | Carson et al. | 427/410 |
| 4,824,728 | A | | 4/1989 | Parsons et al. | 428/421 |
| 5,078,080 | A | | 1/1992 | Schiele | 118/50 |
| 5,229,461 | A | * | 7/1993 | Saitoh et al. | 525/200 |
| 5,490,893 | A | * | 2/1996 | Enlow et al. | 156/230 |
| 5,932,657 | A | * | 8/1999 | Rijkse et al. | 428/416 |

OTHER PUBLICATIONS

Hawley's Condensed Chemical Dictionary, 13th Edition, p. 628, Jan. 1999.*

*VACUMAT*®; "Make The Decision For the Original"; Schiele, Jan. 1998.

*Supply Lines*; "Vacuum Coating Keeps Workplace Air, Environment Clean."; Robert P. Weithofer, Jan. 1998.

*E&R System Technik, Inc.;* "Schiele Vacumat®"; Jan., 1998.

* cited by examiner

*Primary Examiner*—Paul Thibodeau
*Assistant Examiner*—Ramsey Zacharia
(74) *Attorney, Agent, or Firm*—Diane R. Meyers; Deborah M. Altman

(57) ABSTRACT

A multi-layer composite coating composition is provided. The multi-layer composite coating composition includes an exterior-durable, organic solvent-borne base coating composition from which a durable base coating is deposited, and an aqueous top coating composition from which a top coating is deposited over at least a portion of the durable base coating. The multi-layer composite coating compositions are particularly useful as coatings for preformed, three-dimensional, multi-faced substrates employed in building construction, for example, the elongated extruded aluminum substrates used for window and door frames. Coated substrates are also provided.

24 Claims, No Drawings

EXTERIOR-DURABLE MULTI-LAYER COMPOSITE COATING COMPOSITIONS

FIELD OF THE INVENTION

This invention relates to pre-formed substrates coated with multi-layer composite coatings and a process for applying multi-layer coating compositions to such substrates. More particularly the invention relates to a pre-formed substrate having different coatings on respective lateral faces of the substrate and also to a process for forming and drying an exterior-durable multilayer composite coating on three-dimensional, multi-faced substrates.

BACKGROUND OF THE INVENTION

For many years, pre-formed lineal substrates have been used to construct windows, doors and other architectural components. Frequently, it is desirable to provide such lineal substrates with two or more colors on respective lateral faces. Although these multi-colored substrates have been available for use in the industry for some coating systems, such multi-colored substrates are cost-prohibitive for several reasons.

For example, in applications where a multi-colored substrate is required to have a first coating over the second coating, a time-consuming and often expensive process is required for applying and drying the first coating and subsequently masking the substrate prior to application of the second coating.

Further, although aqueous-based coating compositions afford environmental and other advantages, in cases where the second color coating is deposited from an aqueous-based coating composition over an organic solvent-borne base coating, it is sometimes difficult to obtain a continuous and coalesced topcoat film. That typically is because the surface tension of the base coating is greater than the liquid surface tension of the top coating which can result in the inability of the topcoating composition to "wet out" or flow smoothly over the base coating.

Moreover, if the underlying coating is a thermoplastic composition, it is often difficult to use conventional masking techniques when the second coating is dried or cured under thermal conditions. At the drying temperature of the second layer, the thermoplastic first layer can interact with the masking material. This interaction can result in damage or destruction to the thermoplastic first layer as the masking material is removed.

Accordingly, there was a need in the prior art for improvements that would allow the wider use of aqueous-based coating compositions. Also, there was a need in the art for improvements that would allow the use of thermal-drying techniques for coating compositions applied over underlying thermoplastic coatings.

In addition, durable coatings suitable for application to pre-formed, three-dimensional, multi-faced substrates, for example, architectural and building components such as extruded aluminum parts for window and door frames, are well known in the art. Such durable coatings must provide attractive finishes which will cover the substrate and any previously applied coating, for example, a primer coating, while providing resistance to fading, loss of gloss or color change due to outdoor exposure.

Coatings based on fluoropolymers, for example, fluoropolymers such as poly(vinylidene fluoride), are known for their outstanding exterior durability properties, providing tough finishes resistant to crazing, chalking and color change upon weathering and exposure to ultraviolet radiation.

U.S. Pat. No. 3,470,014 discloses an exterior durable multi-layer coating formed from a primer layer having a film thickness of 0.1 to 4.0 mils (2.5 to 100 micrometers), and a second clear layer comprising a fluorocarbon copolymer having a film thickness of 0.1 to 2.0 mils (2.5 to 50 micrometers). The primer layer comprises a pigmented aqueous composition including an aqueous acrylic copolymer dispersion or latex prepared from a polymerizable acrylic acid ester and a primary alkanol, a polymerizable alkyl methacrylate having 1 to 6 carbon atoms in the alkyl group, and an alpha, beta-unsaturated carboxylic acid. The second clear layer comprises a solvent-based composition including a copolymer of vinylidene fluoride and tetrafluoroethylene or perfluoropropene. The coatings are useful for application to wooden or aluminum substrates, such as those used as building materials. The primer coating and the clear coating compositions typically are applied by curtain or roll-coating and each are dried by exposing the coated substrates to thermal conditions.

U.S. Pat. No. 4,314,004 discloses a method for providing durable coated substrates comprising the steps of (a) applying a pigmented coating composition to a substrate wherein the composition consists essentially of 45 to 85 percent based on resin solids of a fluorocarbon resin and a pigment at a pigment volume concentration of from 3 to 55 percent; (b) applying a clear coating composition to the coated substrate of step (a) wherein the clear composition consists essentially of 45 to 85 percent of a fluorocarbon resin and from 15 to 55 percent of an acrylic resin based on resin solids; and (c) baking the coated substrate of step (b) thereby causing the coatings to fuse together in a bonding process. Useful fluorocarbon resins include polyvinyl fluorides, polyvinylidene fluorides, vinyl fluoride copolymers and vinylidene fluoride copolymers. The acrylic resins used in conjunction with the fluorocarbon resins can be thermosetting or thermoplastic resins. The methods are useful for coating primed metal surfaces, for example, aluminum building panels where the multi-layer fluorocarbon resin-containing coatings provide excellent intercoat adhesion believed to result from the presence of fluorocarbon resin in both coatings (see column 4, lines 41–43).

U.S. Pat. No. 4,720,405 discloses a coating composition comprising an organic polyol, a polyepoxide, a polyisocyanate crosslinking agent and a phenolic resin suitable for use as a flexible primer coating for application to structural building components, such as metal building panels. Also disclosed is a method for providing a substrate with a multi-layer coating comprising (a) applying the above-described primer coating; (b) applying a pigmented coating composition comprising a fluoropolymer to the coated substrate of step (a); (c) applying a clear coating composition comprising a fluoropolymer to the coated substrate of step (b); and at least partially curing the coated substrate of step (c). The cured multi-layer coating has an elongation of at least 10 percent. The multi-layer coating has excellent durability and resistance to weathering and aggressive environments.

U.S. Pat. No. 4,659,768 discloses a thermosetting solvent based coating composition comprising about 45 percent of a fluorocarbon polymer in conjunction with at least about 10 percent of a hydroxy-functional organic soluble copolymer based on 2-hydroxyethyl acrylate, and an aminoplast curing agent. Such coatings exhibit improved water spot resistance and minimum color change and gloss loss upon exterior exposure. The coatings are suitable for application to prime-coated aluminum substrates.

U.S. Pat. No. 4,824,728 discloses a durably coated substrate coated with a multi-layer coating. The multi-layer coating includes heavily pigmented opaque base coat composition containing a fluorocarbon resin in conjunction with an acrylic resin and a top coat over the base coat derived from a top coat composition containing a fluorocarbon resin in conjunction with an acrylic resin. The top coat has a pigment content insufficient to prevent the color of the base coat from being easily seen. The substrates include aluminum as well as hot-dipped galvanized steel substrates. The coatings can be applied by spray application techniques to coiled metal stock which is subsequently fabricated, or preformed substrates.

Window and door frames typically are constructed from pre-formed, three-dimensional, multi-faced substrates including elastomeric substrates, such as vinyl substrates, wooden substrates and metallic substrates, such as extruded aluminum substrates. Typically, since at least one side of the installed window or door frame is exposed to the outdoor environment, the coating applied thereto must possess a high degree of exterior durability with respect to ultraviolet radiation, high humidity and industrial pollutants often present in the environment. Such coatings also must be sufficiently flexible to adapt to localized expansion and contraction when applied to wood and/or aluminum substrates which have a high coefficient of expansion.

Coatings are most often spray-applied to the preformed, three-dimensional multi-faced substrates, typically by electrostatic spray application techniques. This application technique results in complete paint coverage of the part and, generally, is an efficient method for coating the varied and complex profiles of three-dimensional workpieces, such as extruded aluminum substrates, particularly when only one color is desired. However, this application technique is very cumbersome if a "two-color" or "two-tone" finish is desired, such that two different colors are to be applied to the same part. This type of finish is useful, for example, on window and door frames when one color is desired for the interior frame and another color is desired for the exterior frame.

The coating practice currently employed to achieve the "two-tone" finish on three-dimensional parts requires that the entire piece is coated with the first color, conveyed through a drying oven, and cooled. Those sections of the part which are to retain the original finish are masked off using heat-resistant masking tape or plastic films. The part is then remounted on the coating line and conveyed again through the paint booth to receive the second desired color. Such a recycling process is quite inefficient in view of production time lost due to interruptions in the coating line. Also, many of the heat-resistant tapes and films will not adhere well to coatings containing fluorocarbon resins due to the low solid surface tension imparted to the coating by such materials.

Additionally, because of the aforementioned low solid surface tension imparted to the coating by fluoropolymers, it is difficult to achieve good intercoat adhesion of a top coat which is not fluoropolymer-based to a base or primary coat which is based upon such fluoropolymers. Hence, as disclosed in the prior art references discussed above, in multi-layer coating applications utilizing coating compositions based on fluoropolymers, typically the first or primary coating can be formed from a coating composition which does or does not contain fluoropolymers, while the top coating compositions which form the top coat thereover are based upon fluoropolymers.

In "two color" or "two tone" applications, such as those discussed above, where a second color is applied to a portion of the part which will not require exterior durability properties, for example, on interior window or door frames, the application of a fluorocarbon-containing exterior-durable coating composition is not cost effective.

In view of the foregoing, a need exists in the industry for a cost effective multi-layer composite coating having good intercoat adhesion suitable for application to preformed, three-dimensional multi-faced substrates, for example, architectural and building materials, such as extruded aluminum parts for window and door frames. Such composite coating compositions would permit the application of a lower cost non-exterior durable top coating composition to a previously formed fluorocarbon-containing, exterior-durable base coat layer.

SUMMARY OF THE INVENTION

In accordance with the present invention, a multi-layer composite coating composition is provided. The multi-layer composite coating composition comprises an exterior-durable base coating composition from which a solvent-borne base coating is deposited, and an aqueous top coating composition from which a top coating is deposited over at least a portion of the exterior-durable base coating. Coated substrates are also provided.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Also, as used herein, the term "polymer" is meant to refer to oligomers and both homopolymers and copolymers. Further, unless indicated otherwise, all molecular weights expressed in the specification and the claims, were determined using gel permeation chromatography using polystyrene standards.

The multi-layer composite coating composition of the present invention comprises an exterior-durable base coating composition from which a solvent-borne base coating is deposited, and an aqueous top coating composition from which a top coating is deposited over at least a portion of the exterior-durable base coating.

As used herein, by "exterior-durable" composition is meant a composition which forms a coating layer which is resistant to crazing, chalking, color change and other manifestations of coating deterioration upon exposure to ultraviolet radiation, weathering and aggressive environments such as those encountered with high levels of industrial pollutants or marine environments.

The exterior-durable base coating composition can be a thermosetting composition or, as is preferred, a thermoplastic composition. The exterior-durable base coating composition preferably comprises a fluoropolymer. In a preferred embodiment of the invention, the exterior-durable base coating composition comprises (a) a fluoropolymer and (b) an adjuvant film-forming polymer which is free of fluorocarbon moieties.

Any of a variety of fluoropolymers can be used in the base coating compositions. Examples of suitable fluoropolymers include polyvinyl fluorides, poly(vinylidene fluorides), vinylidene copolymers, and vinylidene fluorides. The preferred fluoropolymer is poly(vinylidene fluoride).

Examples of suitable copolymers include at least 75 percent by weight, preferably 90 percent or more of vinyl or vinylidene fluoride units. Examples of suitable co-monomers to be copolymerized with the vinyl or vinylidene fluoride include ethylene, propylene, isobutylene, styrene, vinyl chloride, vinylidene chloride, difluorochloroethylene, tetrafluoromethylene, trifluorochloroethylene, hexafluoroproplyene, vinyl formate, vinyl acetate, vinyl propionate, vinyl butyrate, acrylic acid and its salts, methyl (meth)acrylate, allyl (meth) acrylate, acrylonitrile, methacrylonitrile, N-butoxymethylacrylamide, allyl acetate and isopropenyl acetate. (As used herein, "(meth)acrylic" and like terms are intended to include both acrylic and methacrylic.) These fluoropolymers are described in detail in U.S. Pat. Nos. 2,419,010; 2,510,783; 2,435,537; 2,935,818; 2,468,054; and 2,970,988.

The adjuvant polymer can be selected from a wide variety of polymeric materials including acrylic polymers, polyester polymers, polyurethane polymers and polyether polymers. Mixtures of the aforementioned adjuvant polymers can be used. Acrylic polymers are preferred.

The acrylic polymers useful as the adjuvant polymer can be thermoplastic or thermosetting polymers, with thermoplastic acrylic polymers being preferred.

Typically, the acrylic polymers are prepared from polymerizable ethylenically unsaturated monomers by solution polymerization techniques, which are well-known to those skilled in the art, in the presence of suitable catalysts such as organic peroxides or azo compounds, for example, benzoyl peroxide or N,N-azobis(isobutyronitrile). The polymerization typically is carried out in an organic solution in which the monomers are soluble by techniques conventional in the art. The ratio of reactants and reaction conditions are selected to result in an acrylic polymer with the desired properties.

Non-limiting examples of suitable ethylenically unsaturated monomers used to prepare the acrylic polymers employed in the base coating composition include carboxylic acid functional group-containing monomers such as (meth)acrylic acid, acryloxypropionic acid, crotonic acid, fumaric acid, monoalkyl esters of fumaric acid, maleic acid, monoalkyl esters of maleic acid, itaconic acid, monoalkyl esters of itaconic acid and mixtures thereof. Preferred ethylenically unsaturated carboxylic acid monomers are (meth) acrylic acids. Non-limiting examples of other ethylenically unsaturated monomers include vinyl monomers such as alkyl esters of acrylic and methacrylic acids, for example, ethyl (meth)acrylate, methyl (meth)acrylate, butyl (meth) acrylate, 2-ethylhexyl (meth)acrylate, 2-hydroxyethyl (meth)acrylate, hydroxypropyl (meth)acrylate, ethylene glycol di(meth)acrylate, isobornyl (meth)acrylate and lauryl (meth)acrylate; vinyl aromatics such as styrene and vinyl toluene; acrylamides such as N-butoxymethyl acrylamide; acrylonitriles; dialkyl esters of maleic and fumaric acids; vinyl and vinylidene halides; vinyl acetate; vinyl ethers; allyl ethers; allyl alcohols; derivatives thereof and mixtures thereof.

As discussed above, the preferred acrylic polymer is thermoplastic. Suitable thermoplastic acrylic polymers typically are of relatively high weight average molecular weight, i.e., weight average molecular weight ranging from 25,000 to 120,000, preferably ranging from 50,000 to 100,000. A particularly preferred acrylic polymer is the thermoplastic polymerization reaction product of methyl methacrylate and ethyl acrylate having a weight average molecular weight ranging from 50,000 to 120,000.

Suitable thermosetting polymers typically are low molecular weight polymers having reactive functional groups, with functional group-containing acrylic polymers being preferred. Typically, suitable thermosetting acrylic polymers are the low molecular weight (i.e., having a weight average molecular weight ranging from 5000 to 50,000) polymerization reaction products of the above-described ethylenically unsaturated monomers and a reactive functional group-containing ethylenically unsaturated monomer.

The reactive functional group-containing polymers can include the polymerization reaction products of self-reactive functional group-containing monomers, such as N-butoxy methylacrylamide, which contain functional groups capable of self-condensing. Other useful reactive functional group-containing ethylenically unsaturated monomers include hydroxyl functional monomers, such as hydroxy ethyl (meth)acrylate, hydroxy propyl (meth)acrylate and 2-ethylhexyl (meth)acrylate, epoxy functional monomers, such as glycidyl (meth)acrylate and allyl glycidyl ether, and carboxylic acid functional monomers, such as those described above with reference to the thermoplastic acrylic polymers.

Polyester polymers are also useful in the base coating compositions of the invention as the adjuvant polymer. Useful polyester polymers typically include the condensation products of polyhydric alcohols and polycarboxylic acids. Suitable polyhydric alcohols include ethylene glycol, neopentyl glycol, trimethylol propane, and pentaerythritol. Suitable polycarboxylic acids include adipic acid, 1,4-cyclohexyl dicarboxylic acid, and hexahydrophthalic acid. Besides the polycarboxylic acids mentioned above, functional equivalents of the acids such as anhydrides where they exist or lower alkyl esters of the acids such as the methyl esters can be used. Also, small amounts of monocarboxylic acids such as stearic acid can be used. The ratio of reactants and reaction conditions are selected to result in a polyester polymer with the desired pendent functionality, i.e., carboxyl or hydroxyl functionality.

For example, hydroxyl group-containing polyesters can be prepared by reacting an anhydride of a dicarboxylic acid such as hexahydrophthalic anhydride with a diol such as neopentyl glycol in a 1:2 molar ratio. Where it is desired to enhance air-drying, suitable drying oil fatty acids may be used and include those derived from linseed oil, soya bean oil, tall oil, dehydrated castor oil, or tung oil.

Polyurethane polymers can be used as the adjuvant polymer (b) in the base coating compositions. The polyurethane polymers which can be used are those prepared by reacting polyols including polymeric polyols with polyisocyanates. Polyureas containing terminal isocyanate or primary and/or secondary amine groups which also can be used are those prepared by reacting polyamines including polymeric polyamines with polyisocyanates. The hydroxyl/isocyanate or amine/isocyanate equivalent ratio is adjusted and reaction conditions are selected to obtain the desired terminal groups. Examples of suitable polyisocyanates include those described in U.S. Pat. No. 4,046,729 at column 5, line 26 to column 6, line 28, incorporated herein by reference. Examples of suitable polyols include those described in U.S. Pat. No. 4,046,729 at column 7, line 52 to column 10, line 35, incorporated herein by reference. Examples of suitable polyamines include those described in U.S. Pat. No. 4,046,729 at column 6, line 61 to column 7, line 32 and in U.S. Pat. No. 3,799,854 at column 3, lines 13 to 50, both incorporated herein by reference.

Examples of suitable polyether polymers include polyalkylene ether polyols. Exemplary polyalkylene ether polyols include poly(oxytetramethylene) glycols, poly (oxytetraethylene) glycols, poly(oxy-1,2-propylene) glycols, and poly(oxy-1,2-butylene) glycols.

Also useful are polyether polyols formed from oxyalkylation of various polyols, for example, glycols such as ethylene glycol, 1,6-hexanediol, Bisphenol A, and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Specific examples of polyethers include those sold under the names TERATHANE and TERACOL, available from E. I. Du Pont de Nemours and Company, Inc.

Generally, the adjuvant polymers useful in the thermoplastic base coating compositions have a weight average molecular weight typically ranging from 1,000 to 25,000, preferably 1,000 to 15,000 and more preferably 1,000 to 12,000.

In an alternative embodiment of the invention, the base coating composition can comprise a vinylidene fluoride copolymer, preferably in conjunction with a functional group-containing thermosetting polymer. The preferred thermosetting polymer is a hydroxyl group-containing acrylic copolymer, such as those described above. Suitable vinylidene fluoride copolymers and thermosetting polymers are described in U.S. Pat. No. 4,659,768.

If the base coating composition of the present invention is a thermosetting composition, the composition typically further comprises a crosslinking agent.

Crosslinking agents suitable for crosslinking hydroxyl and/or carboxylic functional group-containing materials include aminoplast resins. Aminoplast resins are based on the condensation products of aldehydes, with an amino or amido-group carrying substance. Condensation products obtained from the reaction of alcohols and formaldehyde with melamine, urea or benzoguanamine are most common and preferred herein. While the aldehyde employed is most often formaldehyde, other similar condensation products can be made from other aldehydes, such as acetaldehyde, crotonaldehyde, acrolein, benzaldehyde, furfural, glyoxal and the like. The aminoplast resins preferably contain methylol or other alkylol groups, and in most instances at least a portion of these alkylol groups are etherified by a reaction with an alcohol to provide organic solvent soluble resins. Commonly employed aminoplast resins are substantially alkylated with methanol or butanol. Suitable aminoplast resins include those available under the tradename CYMEL® from Cytec Industries, Inc. and under the tradename RESIMENE® from Solutia, Inc.

Other useful crosslinking agents include polyisocyanates which are useful for crosslinking hydroxyl and/or amine functional group-containing materials. Examples of suitable diisocyanates which can be utilized herein include toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used. Examples of suitable blocking agents include those materials which would unblock at elevated temperatures, that is, at temperatures ranging from 80 to 200° C. Suitable blocking agents can include lower aliphatic alcohols such as methanol, oximes such as methyl ethyl ketoxime and lactams such as caprolactam.

In a preferred embodiment, the base coating composition comprises 45 to 85 weight percent, preferably 50 to 80 weight percent, and more preferably 50 to 70 weight percent based on weight of total resin solids present in the base coating composition of a poly(vinylidene fluoride) polymer, and 15 to 55 weight percent, preferably 20 to 50 weight percent, and more preferably 30 to 50 weight percent based on weight of total resin solids present in the base coating composition of a thermoplastic acrylic polymer.

Preferably, the base coating composition further comprises at least one pigment. Non-limiting examples of pigments suitable for use in the base coating compositions include inorganic pigments such as titanium dioxide, silica, iron oxides, talc, mica, clay, zinc oxide, zinc sulphide, zirconium oxide, carbon black, lead chromate, metallic pigments, molybdate orange, calcium carbonate and barium sulfate. Organic pigments also can be used.

Pigment is typically present in the base coating composition in an amount sufficient to provide a pigment volume concentration ranging from 3 to 55 percent, preferably from 5 to 45 percent, and more preferably from 5 to 35 percent.

As mentioned above, the base coating composition is an organic solvent-based composition. Non-limiting examples of suitable organic solvents include aromatic petroleum distillate, cyclohexane, methyl ethyl ketone, methyl isobutyl ketone, isophorone, alcohols, such as ethyl alcohol, propyl alcohol and diacetone alcohol, dimethyl phthalate and mono- and di-alkyl ethers of ethylene and diethylene glycol, such as ethylene glycol monoethyl ether, ethylene glycol monobutyl ether, ethylene glycol monoethyl ether acetate, diethylene glycol monobutyl ether and diethylene glycol diethyl ether.

Such solvents are typically present in the base coating composition in an amount ranging from 30 to 80 weight percent, preferably 40 to 70 weight percent, based on total weight of the base coating composition. The compositions are substantially free of water, that is, the amount of water present in the compositions is less than 1.0 percent by weight based on total weight of the base coating composition.

The base coating composition also can comprise additives commonly known in the art, such as surfactants, antioxidants, ultraviolet light absorbers, stabilizers, rheology modifiers, coalescing agents, flexibilizers and the like.

The base coating composition typically has solids content (resin solids plus pigment solids) ranging from 25 to 60 weight percent, preferably from 30 to 55 weight percent and more preferably from 35 to 50 weight percent based on total weight of the composition.

It should also be mentioned that as used herein the "base coating composition" can comprise a multi-layer base coating composition comprising (a) a pigmented exterior-durable coating deposited from a pigmented composition comprising a fluoropolymer, such as the base coating compositions described above, and (b) a substantially pigment-free, exterior-durable coating applied to the pigmented coating, deposited from a substantially pigment-free durable coating composition comprising a fluoropolymer. The pigmented coating can be dried (or, if applicable, cured) prior to application of the pigment-free coating composition, or, alternatively, the pigment-free coating composition can be applied "wet-on-wet" to the pigmented coating and the two coating compositions can be dried (or cured) simultaneously.

The top coating composition can be any of a variety of thermosetting or thermoplastic coating compositions known in the art, however, thermosetting top coating compositions are preferred. Also, when the base coating composition is based on a fluoropolymer, it is preferred that the top coating composition is substantially free of fluoropolymer, that is, the composition contains less than 5 percent by weight fluorine based on total weight of resin solids present in the top coating composition. In the base coating composition, the fluoropolymer typically is present in an amount such that the composition contains at least 10 percent by weight, and preferably 27 to 50 percent by weight fluorine based on total weight of resin solids present in the base coating composition.

The top coating composition of the present invention typically comprises a film-forming polymer such as the acrylic, polyester, polyurethane and polyether polymers such as the acrylic, polyester, polyurethane and polyether polymers generally described above with reference to the base coating composition. Acrylic polymers are preferred.

Thermosetting top coating compositions, which are preferred, include thermosetting polymers, preferably thermosetting acrylic polymers such as those comprised of the self-reactive ethylenically unsaturated monomers and/or the reactive functional group-containing ethylenically unsaturated monomers described above with reference to the thermosetting acrylic polymers useful in the thermosetting base coating compositions.

The thermosetting acrylic polymers preferred for use in the top coating composition typically are low molecular weight copolymers (i.e., having a weight average molecular weight ranging from 5,000 to 50,000) made from two or more ethylenically unsaturated monomers including those monomers having self-reactive functional groups and/or reactive functional groups, such as hydroxyl, carboxyl, epoxy and amide functional groups which are capable of reacting with the functional groups of a crosslinking agent.

Such thermosetting acrylic copolymers can be prepared in organic solvent by radical polymerization techniques as described above then dispersed in aqueous medium, or, as is preferred, in water by emulsion polymerization techniques as are well known in the art. A particularly preferred thermosetting acrylic copolymer comprises the emulsion polymerization reaction product of methyl methacrylate, n-butyl acrylate, hydroxypropyl methacrylate, acrylic acid and N-butoxymethylacrylamide.

In a preferred embodiment, the top coating composition is a thermosetting aqueous (i.e., water-based) top coating composition comprising a thermosetting acrylic copolymer, as described above, and a crosslinking agent. Such aqueous top coating compositions are described in detail in U.S. Pat. Nos. 4,220,575 and 4,228,055, the disclosures of which are incorporated herein by reference.

Exemplary of crosslinking agents suitable for use in the thermosetting top coating compositions include the aminoplast resins and the polyisocyanates described above with reference to the base coating compositions. Aminoplast crosslinking agents are preferred.

The thermosetting acrylic polymer typically is present in the top coating composition in an amount ranging from 55 to 95 weight percent, preferably from 60 to 90 weight percent, and more preferably from 65 to 85 weight percent based on weight of total resin solids in the top coating composition. The crosslinking agent typically is present in the top coating composition in an amount ranging from 2 to 25 weight percent, preferably from 4 to 20 weight percent and more preferably from 6 to 16 weight percent based on weight of total resin solids present in the top coating composition.

The preferred top coating compositions can further comprise at least one pigment, suitable examples of which are described above with reference to the base coating composition. Pigment is typically present in the top coating composition in an amount sufficient to provide a pigment volume concentration ranging from 3 to 50 percent, preferably from 5 to 45 percent and more preferably from 5 to 35 percent.

The top coating composition is preferably an aqueous composition as discussed above. Such compositions contain water as a diluent, typically in an amount of at least 20 percent by weight, and preferably in an amount ranging from 25 to 50 percent by weight based on total weight of the top coating composition.

The top coating composition also can comprise additives commonly known in the art, such as surfactants, antioxidants, ultraviolet light absorbers, stabilizers, rheology modifiers, coalescing agents, flexibilizers and the like.

The top coating composition typically has a solids content (resin solids plus pigment solids) ranging from 40 to 70 weight percent, preferably from 45 to 65 weight percent and more preferably from 50 to 60 weight percent based on total weight of the composition.

As discussed above, the multi-layer composite coating compositions of the invention are particularly suitable for application to preformed, three-dimensional, multi-faced substrates. The substrate can be an elongated three-dimensional, multi-faced substrate comprising any of a variety of materials, including metals, for example, steel and aluminum, elastomeric materials, for example, vinyl, wood and composite materials. Preferably, the substrate is an extruded aluminum substrate, such as those commonly employed in the building industry, for example, the extruded aluminum substrates used in the manufacture of window and door frames.

Typically, the base coating composition is applied to the entire exterior surface of the substrate. Any application method which will accomplish coverage of the entire three-dimensional, multi-faced substrate with the base coating composition to form a base coat thereon can be used. Non-limiting examples of application methods include dip-coating techniques, flow- coating techniques and spray techniques, including both conventional and electrostatic spray techniques. In a preferred embodiment of the invention, the base coating composition is applied to the substrate by electrostatic spray techniques.

The base coating composition typically is applied to the substrate in an amount sufficient to form a base coat thereon having a dry film thickness ranging from 0.5 to 5.0 mils (12.7 to 127 micrometers), preferably from 1.0 to 2.5 mils (25.4 to 63.5 micrometers).

Once the base coating composition is applied to the entire exterior surface of the substrate, the base coated substrate is dried (or, if applicable, cured) on the substrate to form a continuous base coat on the entire exterior surface of the substrate.

In a preferred embodiment of the invention, typically when the base coating composition comprises a fluoropolymer as described above, the exterior-durable base coat formed on the entire exterior surface of the substrate has a solid surface tension ranging from 30 to 50 dynes/centimeter.

For purposes of the present invention, solid surface tension can be measured according to the Owens-Wendt method using a Rame'-Hart Contact Angle Goniometer with distilled water and methylene iodide as reagents. Generally, a 0.02 cc drop of one reagent is placed upon the dried or cured coating surface and the contact angle and its complement are measured using a standard microscope equipped with the goniometer. The contact angle and its complement are measured for each of three drops. The process is then repeated using the other reagent. An average value is calculated for the six measurements for each of the reagents. The solid surface tension is then calculated using the Owens-Wendt equation:

$$\{\gamma l(1+\cos\phi)\}/2=(\gamma l^{d}\gamma_{s}^{d})^{1/2}+(\gamma l^{p}\gamma_{s}^{p})^{1/2}$$

where γl is the surface tension of the liquid (methylene iodide=50.8, distilled water=72.8) and $\gamma^d$ and $\gamma^p$ are the dispersion and polar components (methylene iodide $\gamma^d$=49.5, $\gamma^p$=1.3; distilled water $\gamma^d$=21.8, $\gamma^p$=51.0; the values for φ measured and the cos φ determined. Two equations are then set up, one for methylene iodide and one for water, with the only unknowns being $\gamma_s^d$ and $\gamma_s^P$. The two equations are then solved for the two unknowns. The two components combined represent the total solid surface tension.

The base coated substrate can be dried (or, if applicable, cured) in any conventional manner, such as by convective air flow (either ambient temperature or heated air), radiant heat, e.g., quartz lamp, gas-fired radiant heater, and electric radiant heater; convective or forced-air heat, conductive, e.g., heating the coated substrate on a heatable platen or stage, or by vacuum drying.

In a preferred embodiment of the invention, where the base coating composition is a thermoplastic composition, the base coat is dried by exposure to thermal conditions typically a temperature ranging from 230° C. to 400° C., and preferably from 240° C. to 300° C.

It should be understood that the drying or curing temperature can vary according to variations in the chemistry of the base coating composition itself, as well as to variability in line speeds of various coating lines. For example, faster line speeds result in shorter oven "dwell times" which can necessitate higher temperatures, while slower line speeds result in longer oven "dwell times" which can necessitate lower temperatures. As used herein, by the term "dwell time" is meant the actual time the coated substrate is exposed to the heat source. Moreover, it should be understood that a thermosetting base coating composition may require higher temperatures to effect the crosslinking reaction.

The top coating composition, which preferably is different from the base coating composition, is applied to the base coated substrate to form a top coat on a portion of the exterior surface of the substrate. In a preferred embodiment of the invention, the top coating composition is applied to at least one but not all of the faces of the three dimensional, multi-faced substrate.

Any application method which will accomplish this selective coverage of the three-dimensional, multi-faced substrate with the top coating composition to form a top coat thereon can be used. Non-limiting examples of application methods include roll-coating techniques, flow coating techniques, spray techniques, including both conventional and electrostatic spray techniques, as well as vacuum coating techniques. In a preferred embodiment of the invention, the top coating composition is selectively applied to at least one but not all of the faces of the substrate by vacuum coating techniques.

Generally in a vacuum coating process, a liquid coating is pumped into a reservoir located at the bottom of an application chamber. A vacuum is drawn on the liquid coating filled chamber, causing the coating to be suctioned upward into the application chamber and atomized, thereby forming a mist of liquid coating within the chamber. The substrate to be coated is conveyed through the coating mist and is coated on all exposed surfaces. The contour of the application chamber in-feed and out-feed matrices is adapted to match the general contour of the three-dimensional substrate, allowing a space for air to pass over the substrate surface. As the coated substrate exits the application chamber, air passing through these small contoured openings around the substrate draw the excess coating material back into the application chamber. The excess coating material is then recycled back into the coating process. The air vacuum serves to suction the coating material from the bottom of the chamber into the application area, vaporizing the coating with cyclonic action, and, also, to create a laminar flow of air through the contoured entry and exit slots, thereby removing excess coating and smoothing the coated substrate surface.

It is possible to selectively coat at least one but not all of the faces of a three dimensional, multi-faced substrate through the use of specifically designed "counter profiles" or "shields" which block those portions of the substrate which are not to receive the top coating. Each substrate profile requires a specifically designed shield.

A preferred vacuum coating apparatus is described in detail in U.S. Pat. No. 5,078,080, the disclosure of which is incorporated herein by reference.

The top coating composition typically is applied to the base coating in an amount sufficient to form a top coat over at least a portion of the base coat having a dry film thickness ranging from 0.5 to 5.0 mils (12.7 to 127 micrometers), preferably from 1.0 to 2.5 mils (25.4 to 63.5 micrometers).

To ensure complete and uniform coverage of the portion of the base coating area to which it is applied, it is preferable that the top coating composition have a liquid surface tension which is less than or equal to the solid surface tension of the base coating.

Once the top coating composition is selectively applied to at least one but not all of the faces of the three-dimensional substrate to form a top coat thereon, the coating composition is dried or cured on the substrate to form a continuous top coat on the surface of the faces of the substrate to which it was applied.

The top coat can be dried or cured in any conventional manner, such as by convective air flow (either ambient temperature or heated air), radiant heat, e.g., quartz lamp, gas-fired radiant heater, and electric radiant heater; convective or forced-air heat, conductive, e.g., heating the coated substrate on a heatable platen or stage, or by vacuum drying. Any of these drying (or, if applicable, curing) methods, if desired, can be assisted by exposing the coated substrate to infrared radiation.

In a preferred embodiment of the invention, where the top coating composition is an aqueous thermosetting composition, the top coating composition is cured at a temperature typically ranging from 150° C. to 400° C., and preferably from 170° C. to 350° C.

As discussed above with reference to the base coating composition, it should be understood that the drying temperature can vary according to variations in the chemistry of the top coating composition itself, as well as to variability in line speeds of various coating lines. Moreover, it should be understood that thermosetting top coating compositions may require higher temperatures to effect the crosslinking reaction.

Illustrating the invention are the following examples which, however, are not to be considered as limiting the invention to their details. Unless otherwise indicated, all parts and percentages in the following examples, as well as throughout the specification, are by weight.

EXAMPLES

Examples 1 and 2 describe the preparation of laboratory test panels coated with a multi-layer composite coating composition of the present invention. Examples 3 through 7 describe the preparation of production line trial extruded aluminum substrates coating with the multi-layer composite coating composition of the present invention.

Test Panel Preparation

Exterior-Durable Base Coating Composition

DURANAR® UC51733 (Hartford Green), an exterior-durable, thermoplastic fluoropolymer-containing coating composition commercially available from PPG Industries, Inc., was drawn down with a wire wound bar as a base coating composition to aluminum substrate test panels pretreated with PERMATREAT® 1500, a phosphoric acid based pretreatment composition available from Betz. The base coating composition was applied to the test panels in an amount sufficient to provide a base coat dry film thickness ranging from 1.0 to 1.2 mils (25 to 30 micrometers). The test panels were baked at a temperature of 475° F. (246° C.) for 10 minutes to dry the coating.

Examples 1 and 2

Two sets of laboratory test panels coated with the multi-layer composite coating composition of the present invention were prepared as follows:

In Example 1, ENVIRON® 1MW41645, a white thermosetting aqueous acrylic-based coating composition which is free of fluoropolymer was drawn down over the base coated test panels, prepared as described above, with a wire wound bar and thereafter cured at a temperature of 420° F. (216° C.) peak metal temperature for 20 seconds. The top coating dry film thickness ranged from 0.8 to 1.2 mils (20 to 30 micrometers).

In Example 2, ENVIRON® 1MN40902, a brown thermosetting aqueous acrylic-based coating composition which is free of fluoropolymer was drawn down over the base coated test panels, prepared as described above, with a wire wound bar and thereafter cured at a temperature of 420° F. (216° C.) peak metal temperature for 20 seconds. ENVIRON® 1 MW41645 and 1 MN40902 are both commercially available from PPG Industries, Inc.

The coated test panels of Examples 1 and 2 were tested for 60° gloss (in accordance with ASTM D523 using a BYK Gardner Glossgard II glossmeter), pencil hardness (in accordance with ASTM D3363-92A), cross-hatch adhesion (in accordance with ASTM D3359-97) and mar resistance. Mar resistance was tested by gently scuffing the coating surface using a nickel coin held at approximately 45° angle to the surface of the sample panel. Test results are reported in the following Table 1.

TABLE 1

| | EXAMPLE 1 | EXAMPLE 2 |
|---|---|---|
| DFT base coat | 1.0–1.2 mils | 1.0–1.2 mils |
| DFT top coat | 0.8 mils | 1.0–1.2 mils |
| 60° Gloss | 36.3 | 6.8 |

TABLE 1-continued

| | EXAMPLE 1 | EXAMPLE 2 |
|---|---|---|
| Pencil hardness | B-HB | 2B |
| Cross-hatch adhesion | 100% adhesion | 100% adhesion |
| Mar | None | None |

The data presented in Table 1 above illustrate that the multi-layer composite coating composition of the present invention which includes a fluoropolymer-containing base coating composition and the aqueous top coating composition which is free of fluoropolymer, provides multi-layer composite coatings over aluminum substrate having excellent adhesion properties while meeting mar requirements.

Examples 3–7

Examples 3 through 5 describe the coating of extruded aluminum three-dimensional, multi-faced substrates under production line conditions using the multi-layer composite coating compositions of the present invention. In Examples 3–5, the substrates were base coated with DURANAR® UC51733 (Hartford Green), UC52006 (River Rouge Red), and UC52064 (Arabian Blue), respectively, each of which is an exterior-durable fluoropolymer containing coating commercially available from PPG Industries, Inc. The exterior-durable base coating compositions were electrostatically spray applied to the substrates and dried at a temperature of 475° F. (246.1° C.) for 10 minutes (peak metal temperature of 350° F. (176.7° C.)). The base coat dry film thickness ranged from 1.0 to 1.6 mils (25 to 40 micrometers).

Examples 6 and 7 describe the coating of extruded aluminum three-dimensional, multi-faced substrates under production line conditions using the multi-layer composite coating compositions of the present invention. In Examples 6 and 7, the substrates were base coated with DURACRON® UC85613 and UC89008, respectively, each of which is an acrylic-based exterior-durable coating commercially available from PPG Industries, Inc. The exterior-durable base coating compositions were electrostatically spray applied to the substrates and dried at a temperature of 475° F. (246.1° C.) for 10 minutes. The base coat dry film thickness ranged from 1.0 to 1.4 mils (25 to 35 micrometers).

The above-described base coated three-dimensional, multi-faced substrates were then conveyed to a vacuum coating station located on the coating line for application of ENVIRON® UCT54983, a white thermosetting acrylic-based aqueous top coating composition, to one face of the substrate.

The vacuum coater employed in the top coating process was a Schiele VACUMAT®-M, manufactured by Schiele Maschinenbou GMBH and distributed by E&R System Technik, Inc. of Springfield, Massachusetts. The vacuum coating line speed varied from 0.25 to 1 foot per second.

The aqueous top coating composition was applied in an amount sufficient to provide a dry film thickness ranging from 0.9 to 1.2 mils (22.5 to 30 micrometers). Upon exiting from the vacuum coater, the coated substrates were conveyed to an oven for curing at a temperature ranging from 340° F. to 400° F. (171.1° C. to 204.4° C.) and a dwell time ranging from 4 to 6 minutes.

The coated panels were then tested for 60° gloss (in accordance with ASTM D523 using a BYK Gardner Glossgard II glossmeter), pencil hardness (in accordance with ASTM D3363-92A), and cross-hatch adhesion (in accordance with ASTM D3359-97). Test results are reported in the following Table 2.

TABLE 2

| | EXAMPLE 3 | EXAMPLE 4 | EXAMPLE 5 | EXAMPLE 6 | EXAMPLE 7 |
|---|---|---|---|---|---|
| Adhesion | 100% | 100% | 100% | 100% | 100% |
| Pencil Hardness | HB-2B | HB-2B | HB-2B | HB-2B | HB-2B |
| Gloss 60° | 10–45 | 10–45 | 10–45 | 10–45 | 10–45 |

The data presented in Table 2 above illustrate that the multi-layer composite coating composition of the present invention which includes an exterior-durable base coating composition and the thermosetting aqueous top coating composition which is free of fluoropolymer, provides multi-layer composite coatings over aluminum substrate having excellent adhesion properties while meeting mar and gloss requirements.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore we claim:

1. A multi-layer composite coating composition comprising an exterior-durable, organic solvent-borne base coating composition from which a durable base coating is deposited, and an aqueous top coating composition from which a top coating is deposited over at least a portion of the durable base coating, wherein the aqueous top coating composition is substantially free of fluoropolymer, and wherein the durable base coating composition is a pigmented thermoplastic composition comprising:

45 to 85 weight percent based on total resin solids present in the composition of a poly(vinylidene fluoride); and 15 to 55 weight percent based on total resin solids present on the composition of a thermoplastic acrylic polymer.

2. The multi-layer composite coating composition of claim 1, wherein the vinylidene fluoride copolymer comprises reactive functional groups.

3. The multi-layer composite coating composition of claim 2, wherein the durable base coating composition further comprises a curing agent having functional groups reactive with the functional groups of the vinylidene fluoride copolymer.

4. The multi-layer composite coating composition of claim 3, wherein the curing agent is selected from the group consisting of aminoplast resins, phenoplast resins, blocked isocyanates and mixtures thereof.

5. The multi-layer composite coating composition of claim 1, wherein the durable base coating composition further comprises an adjuvant film-forming polymer which is free of fluorocarbon moieties.

6. The multi-layer composite coating composition of claim 5, wherein the film-forming polymer is selected from the group consisting of acrylic polymers, polyester polymers, polyurethane polymers, polyether polymers and mixtures thereof.

7. The multi-layer composite coating composition of claim 6, wherein the film-forming polymer is an acrylic polymer.

8. The multi-layer composite coating composition of claim 6, wherein the film-forming polymer is a thermoplastic acrylic polymer.

9. The multi-layer composite coating composition of claim 6, wherein the film-forming polymer is a thermosetting polymer having reactive functional groups.

10. The multi-layer composite coating composition of claim 9, wherein the film-forming polymer is a thermosetting acrylic polymer having reactive functional groups.

11. The multi-layer composite coating composition of claim 1, wherein the durable base coating composition further comprises at least one pigment.

12. The multi-layer composite coating composition of claim 11, wherein the pigment is present at a pigment volume concentration on a dry film basis ranging from 3 to 55 percent.

13. The multi-layer composite coating composition of claim 1, wherein the top coating composition comprises a film-forming polymer selected from the group consisting of acrylic polymers, polyester polymers, polyurethane polymers, polyether polymers and mixtures thereof.

14. The multi-layer composite coating composition of claim 13, wherein the film-forming polymer comprises a thermoplastic polymer.

15. The multi-layer composite coating composition of claim 13, wherein the film-forming polymer is a thermosetting polymer having reactive functional groups.

16. The multi-layer composite coating composition of claim 15, wherein the top coating composition further comprises a curing agent containing functional groups reactive with the functional groups of the film-forming polymer.

17. The multi-layer composite coating composition of claim 16, wherein the curing agent is selected from the groups consisting of aminoplasts resins, phenoplast resins, blocked isocyanates, and mixtures thereof.

18. The multi-layer composite coating composition of claim 1, wherein the top coating composition further comprises at least one pigment.

19. The multi-layer composite coating composition of claim 1, wherein the base coating composition has a solid surface tension ranging from 30 to 50 dynes per centimeter.

20. The multi-layer composite coating composition of claim 1, wherein the liquid surface tension of the top coating composition is less than or equal to the solid surface tension of the durable base coating.

21. A three-dimensional, multi-faced substrate coated with the multi-layer composite coating composition of claim 1.

22. The substrate of claim 21, wherein said substrate is an extruded aluminum substrate.

23. A multi-layer composite coating composition comprising an exterior-durable, organic solvent-borne base coating composition from which a durable base coating is deposited, and an aqueous top coating composition from which a top coating is deposited over at least a portion of the durable base coating, wherein the aqueous top coating composition is substantially free of fluoropolymer, and wherein the durable base coating composition is a pigmented thermosetting composition comprising:

55 to 90 weight percent based on total resin solids present in the composition of a vinylidene fluoride copolymer having reactive functional groups; and 10 to 45 weight percent based on total resin solids present in the composition of a curing agent having functional groups reactive with the functional groups of the vinylidene fluoride copolymer.

24. The multi-layer composite coating composition of claim 23, wherein the durable base coating composition further comprises:

10 to 50 weight percent based on total resin solids present on the composition of a thermosetting acrylic polymer having functional groups reactive with the functional groups of the vinylidene fluoride copolymer and/or the curing agent.

* * * * *